(12) United States Patent
Kim

(10) Patent No.: US 10,211,886 B2
(45) Date of Patent: Feb. 19, 2019

(54) WIRELESS COMMUNICATION DEVICE AND METHOD WITH LOW POWER MODES

(71) Applicant: FCI INC, Bundang-gu (KR)

(72) Inventor: Beom Jin Kim, Bundang-gu (KR)

(73) Assignee: FCI INC, Bundang-Gu (KR)

( * ) Notice: Subject to any disclaimer, the term of this patent is extended or adjusted under 35 U.S.C. 154(b) by 0 days.

(21) Appl. No.: 15/986,853

(22) Filed: May 23, 2018

(65) Prior Publication Data

US 2018/0343036 A1 Nov. 29, 2018

(30) Foreign Application Priority Data

May 24, 2017 (KR) .......................... 10-2017-0064328

(51) Int. Cl.
| | |
|---|---|
| *H04W 52/02* | (2009.01) |
| *H04B 5/00* | (2006.01) |
| *H04W 48/16* | (2009.01) |
| *H04W 36/00* | (2009.01) |
| *H04L 25/02* | (2006.01) |

(52) U.S. Cl.
CPC ....... *H04B 5/0031* (2013.01); *H04L 25/0212* (2013.01); *H04W 36/0072* (2013.01); *H04W 48/16* (2013.01); *H04W 52/0261* (2013.01)

(58) Field of Classification Search
CPC ............. H04W 56/001; H04W 72/042; H04W 72/0446; H04L 5/0048; H04L 12/4633; H04L 5/001; G06F 1/12; G06F 3/038
See application file for complete search history.

(56) References Cited

U.S. PATENT DOCUMENTS

| | | | |
|---|---|---|---|
| 2010/0317305 A1* | 12/2010 | Sahlin | H04L 25/0212 455/181.1 |
| 2014/0044105 A1* | 2/2014 | Bontu | H04L 5/001 370/336 |
| 2015/0117309 A1* | 4/2015 | Gage | H04W 8/005 370/328 |
| 2017/0070337 A1* | 3/2017 | Giriyappa | H04L 12/4633 |
| 2017/0172473 A1* | 6/2017 | Wedekind | G06F 19/00 |

* cited by examiner

*Primary Examiner* — Ganiyu A Hanidu
(74) *Attorney, Agent, or Firm* — Mark M. Friedman

(57) ABSTRACT

The present disclosure discloses a wireless communication device and method with low power modes. According to an aspect of the present embodiment, an object is to provide a wireless communication device and method, which may set an accurate timing advance by synchronizing a clock signal provided to a timer with a clock signal provided to a near-field wireless communication circuit.

20 Claims, 4 Drawing Sheets

WIRELESS COMMUNICATION DEVICE AND METHOD WITH LOW POWER MODES

FIELD OF INVENTION

The present disclosure relates to a wireless communication device and method with low power modes, and more particularly to a wireless communication device and method which consume lower power and communicate smoothly with a repeater.

BACKGROUND OF INVENTION

The content described in this part only provides background information of the present embodiment and is not constituted to the prior art.

The wireless communication device refers to devices for sending and receiving data, wherein the data are sent and received by using wireless communication with a managing device such as a server or relaying for the managing device and a wireless communication. The wireless communication device includes not only devices for a purpose of wireless communication such as a tablet PC, a personal computer (PC), a smartphone, or a mobile communication terminal, but also devices of the Internet of Things (IoT) such as smart home appliances, smart watches, and the like. The repeater periodically transmits a beacon, so as to notify an existence of a wireless network, such that the wireless communication device may join the wireless network, and terminals may use the wireless network to send and receive data by receiving the beacon.

Now, in a case that the wireless communication device is an IoT device, the communication session will be continuously held, and a large amount of data will be continuously transmitted and received. Therefore, a problem of power consumption is generated. Such problem related to power consumption does not have a significant impact on devices such as refrigerators, TVs (Televisions), and the like belong the IoT that receives power through common power supplies and devices such as automobiles and the like that have a large-capacity power supply. However, devices such as locks of a door and intelligent watches that may be operated by small batteries and are sensitive to power consumption, thereby having a low power mode in order to minimize power consumption. FIG. 1 shows a method of operating a wireless communication device in low power modes.

FIGS. 1A, 1B, and 1C are diagrams illustrating a method of operating a conventional wireless communication device in low power modes.

FIG. 1A is a graph showing an operation of the wireless communication device in the low power modes.

Wireless communication devices periodically repeat an operation divided into a sleep mode 110 and a wake-up mode 120. The sleep mode is a mode for supplying power only to at least one established of a plurality of constituent elements for enabling wireless communication devices to hold communication sessions and cutting off power to rest of the constituent elements, such that only the minimum of the constituent elements in the wireless communication device operates. In order to that wireless communication devices may operate in the sleep mode and may operate in the wake-up mode again, the wireless communication devices may supply power only to general purpose input/outputs (GPIOs), a timer, and a storage circuit, and may cut off power to rest of the constituent elements to minimize the power consumption, wherein the general purpose input/outputs may receive a clock from outside, the timer may receive a clock signal and provide a moment for changing the modes, and the storage circuit is configured to hold the communication sessions. The wake-up mode is a mode for supplying power to all of the constituent elements in the wireless communication devices, such that all of the constituent elements operate. The wireless communication devices may operate in the wake-up state to receive various data together with a beacon from the repeater for a long time and may operate in the wake-up state to receive the beacon only from the repeater for a short time.

The wireless communication device operates periodically in the sleep mode followed by the wake-up mode according to clock signals received from outside, so that the beacon transmitted by the repeater may be received. The outer clock signals are timed in units of fixed cycles, thereby enabling the wireless communication device to operate in the wake-up mode during a period of the timing. However, in order to change the modes, the clock signals without restrictions such as a standard are received by the wireless communication devices. Therefore, there are problems in which the frequency is lower and the tolerance is very poor. Thus, the problem as shown in FIG. 1B is generated.

FIG. 1B is a diagram showing an embodiment of the conventional wireless communication devices entering the wake-up state.

Conventional wireless communication devices operate in the sleep mode 110 followed by the wake-up mode 120 and then operate in the sleep mode followed by the wake-up mode 140 again, according to the clock signals received from the outside. However, as described above, in order to change the modes, there are problems in which the frequency is lower and the tolerance is very poor. Therefore, it is not possible to align the time in advance of converting from the sleep mode to the wake-up mode in correspondence with a moment 130 at the beacon actually transmitted by the repeater, the conversion of modes will be occurring later. For example, if a tolerance of the clock signal is set to 500 p.p.m. (parts per million) and a cycle of the sleep mode is assumed to be 100 seconds, then the error at the moment of operating in the wake-up mode becomes 0.05 second. Due to such an error, the wireless communication devices operate in the wake-up mode 140 after the moment 130 at the beacon actually transmitted by the repeater, thereby causing a problem in which the beacon or data transmitted by the repeater may not be received.

In order to prevent such a problem, conventional wireless communication devices are controlled as follows, the maximum error at the moment of operating in the wake-up mode is predetermined by referring a cycle of the operation in the sleep mode with the tolerance of a clock signal, and the wake-up mode is operated in advance based on the error. The time in which the wireless communication devices operate in the wake-up mode in advance as described above is referred to as a timing advance (TA: Timing Advance, hereinafter abbreviated as "TA").

FIG. 1C is a diagram showing another embodiment of the conventional wireless communication devices entering the wake-up state.

The conventional wireless communication devices are controlled to operate in the wake-up mode 145 in advance of a TA 150 that is compared with the moment of operating in the wake-up mode 140 according to the timing of the clock signal. However, in order to prevent a problem of the conventional wireless communication devices operated in the wake-up mode slowly than the moment of the repeater actually transmitting a beacon, the TA is set based on the maximum error at the moment of operating in the wake-up mode, so as to increase the time for the operation in the wake-up mode, thereby generating a problem of increasing the power consumption of the wireless communication device.

Therefore, in order to minimize the power consumption in the wireless communication devices, it is necessary to set the optimal TA.

SUMMARY OF INVENTION

Problem to be Solved in the Invention

An object of the present embodiment is to provide a wireless communication device and method capable of setting an accurate TA by synchronizing a clock signal provided to a timer with a clock signal provided to a near-field wireless communication circuit.

Another object of the present embodiment is to provide a wireless communication device and method for setting an accurate TA according to a situation in which a TA is set based on time of an operation in a wake-up mode.

Means to Solve the Problem

According to an aspect of the present embodiment, a wireless communication device is provided, the wireless communication device is configured to operate in a sleep mode or a wake-up mode, wherein the sleep mode is configured to apply power only to at least one established of a plurality of constituent elements and cuts off power to rest of the constituent elements, and the wake-up mode is configured to apply power to all of the constituent elements, the wireless communication device comprising: a timer configured to receive a first clock signal from outside of the wireless communication device, wherein the first clock signal has a first frequency; a first counter circuit configured to count a timing number of the first clock signal; a near-field wireless communication circuit configured to apply power for performing a near-field wireless communication with a repeater to receive a second clock signal from outside of the wireless communication device only in the wake-up mode, wherein the second clock signal has a second frequency; a second counter circuit configured to count a timing number of the second clock signal; a control circuit configured to calculate a timing advance (TA) based on an error, a set benchmark, and a length of a period of the wireless communication device operating in the sleep mode, by controlling the first counter circuit and the second counter circuit to stop counting, when the timing number of the first clock signal counted by the first counter circuit becomes the set benchmark, wherein the error is defined between the timing number really counted and the timing number theoretically counted from a start of counting until a stop of counting by the second counter circuit, in a case of the wireless communication device during operation in the wake-up mode at Nth time.

In addition, according to another aspect of the present embodiment, a timing advance (TA) calculation method is provided, in which a timing advance is calculated by a wireless communication device configured to operates in a sleep mode and a wake-up mode, wherein the sleep mode is configured to apply power only to at least one established of a plurality of constituent elements and cut off power to rest of the constituent elements, and the wake-up mode is configured to apply power to all of the constituent elements, the timing advance calculation method comprises: a receiving process for receiving a first clock signal from outside of the wireless communication device, wherein the first clock signal has a first frequency; a first counting process for counting a timing number of the first clock signal; a receiving process for receiving a second clock signal from outside of the wireless communication device only in the wake-up mode, wherein the second clock signal has a second frequency; a second process for counting a timing number of the second clock signal; a control process for calculating the timing advance based on an error, a set benchmark, and a length of a period of the wireless communication device operating in the sleep mode, by controlling the first counter circuit and the second counter circuit to stop counting, when the timing number of the first clock signal counted by the first counter circuit becomes the set benchmark, wherein the error is defined between the timing number really counted and the timing number theoretically counted from a start of counting until a stop of counting by the second counter circuit, in a case of the wireless communication device during operation in the wake-up mode at Nth time.

Effects of the Invention

As described above, according to an aspect of the present embodiment, an accurate TA is set by synchronizing a clock signal provided to a timer with a clock signal provided to a near-field wireless communication circuit. Therefore, there is an advantage in which the power consumption may be minimized by shortening the time for operating in the wake-up mode.

In addition, according to an aspect of the present embodiment, in a case of setting the TA, the wireless communication device sets the TA based on the time when the wake-up mode is operated. Therefore, the wireless communication device has a advantage of setting an accurate TA as appropriate.

DETAILED DESCRIPTION OF PREFERRED EMBODIMENTS

Figure 1A:
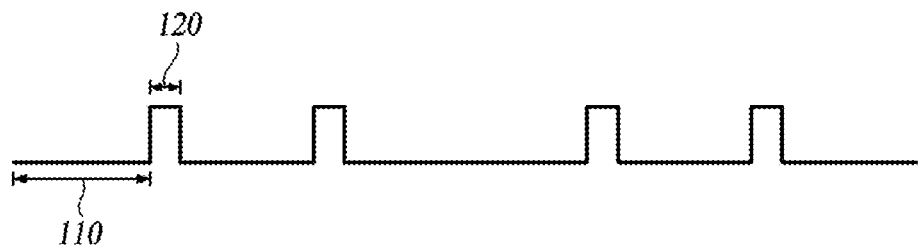
FIGS. 1A, 1B, and 1C are diagrams showing a method of conventional wireless communication devices operating in low power modes.

Hereinafter, a part of embodiments of the present disclosure will be described in detail by way of illustrations. When the reference numerals are assigned to elements of constituents in the drawings, it should be noted that the same elements of constituents are provided with the same symbols as much as possible even in different drawings. In addition, in the description of the present disclosure, in a case that a determination for a detailed description of the related known composition or function will be confused to a purpose of the present disclosure, the detailed description of the related known composition or function will be omitted.

In addition, in the present disclosure, when it is stated that a certain part "include" or "have" certain elements of constituents, unless otherwise specified, it means that includes other elements of constituents and does not mean to exclude other elements of constituents. In addition, terms such as "circuit" and "module" described in the specification mean a unit, wherein the unit is processing for at least one function or action and may be implemented by a hardware or a combination of the hardware and the software.

Figure 2:
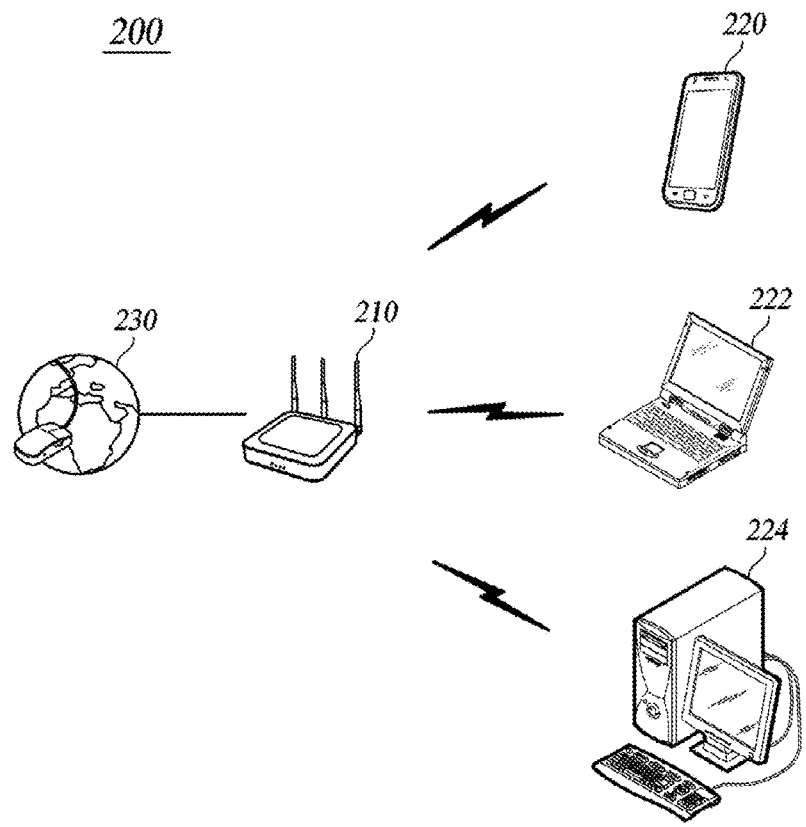
FIG. 2 is a diagram showing a wireless communication system according to an embodiment of the present disclosure.

FIG. 2 is a diagram showing a wireless communication system according to an embodiment of the present disclosure.

Referring to FIG. 2, a wireless communication system 200 according to an embodiment of the present disclosure includes a repeater 210, wireless communication devices 220, 222, and 224, and the Internet 230.

The repeater 210 is a device which connects the Internet 230 with the wireless communication devices 220, 222, and 224, such that a wireless network may be used to the wireless communication devices 220, 222, and 224. The repeater 210 has public service identification information and is connected to one or more of the wireless communication devices 220, 222, and 224 by using the public service identification information. The repeater 210 is connected with the Internet 230, so that the wireless communication devices 220, 222, and 224 may be connected to the Internet 230, wherein the wireless communication devices 220, 222, and 224 are being connected to the repeater 210. Herein, the identification information refers to information which may identify the relay 210. There is a representative example, which may act as a service set Identifier (SSID).

The repeater 210 may realize various constituent elements according to forms of the wireless network. For example, in a case that the wireless network is Wi-Fi (wireless fidelity), the repeater 210 may be implemented by an access point (AP). However, it does not have to be limited as described here. The Internet 230 may be connected to the wireless communication devices 220, 222, and 224 as described above, such that the wireless communication devices 220, 222, and 224 may be implemented by using any device of the wireless network. However, the following description assumes that the wireless network is Wi-Fi and the repeater 210 is an AP.

The repeater 210 periodically transmits a beacon to wireless communication devices which are being connected to the repeater 210. The so-called beacon refers to a signal which is transmitted by the repeater 210, so as to notify the existence of the wireless network, such that the wireless communication device may join the wireless network. The wireless communication devices 220, 222, and 224 which have received the beacon transmit a response corresponding to the beacon to the repeater 210. Therefore, the wireless communication devices 220, 222, and 224 may be connected to the repeater 210 to use the Internet 230.

The wireless communication devices 220, 222, and 224 are devices which connect to the repeater 210 to use the wireless network. The wireless communication devices 220, 222, and 224 include all communication devices such as smart phones, tablet PCs, smart watches, and the like. In addition, the wireless communication devices 220, 222, and 224 further include all IoTs (Internet of Things) devices such as locks of a door, smart home appliances, smart cards, and the like, wherein the all IoTs are capable to use the wireless network. In particular, the wireless communication devices 220, 222, and 224 may refer to devices which operate with a smaller battery and are therefore sensitive to power consumption for operating in low power modes, alternatively, even if the device have a common power supply or a large-capacity power supply but have low power modes to reduce power consumption.

Figure 1B:
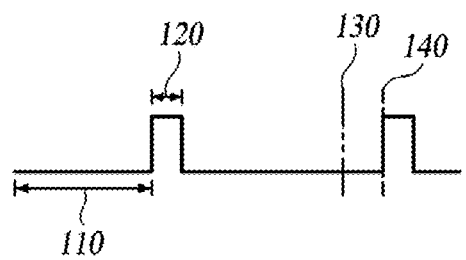
Figure 1C:
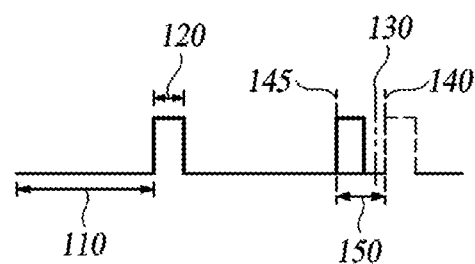

As shown in FIG. 1, the low power modes of the wireless communication devices 220, 222, 224 are divided into a wake-up mode and a sleep mode. The wake-up mode supplies power to all of a plurality of constituent elements which involves wireless communication circuits during cycles of a beacon or a combination of the beacon and data transmitted by the repeater 210. The sleep mode does not supply power to rest of the constituent elements except for a part of the constituent elements except during the cycles in the beacon or the combination of the beacon and data transmitted by the repeater 210. The wireless communication devices 220, 222, and 224 periodically repeat the operation in the sleep mode and the wake-up mode, thereby supplying power to appropriate constituent elements and minimizing power consumption only when needed. The wireless communication devices 220, 222, and 224 may operate in the wake-up mode during each of the cycles in the beacon or the combination of the beacon and data (BI: Beacon Interval) transmitted by the repeater 210, alternatively, the wireless communication devices 220, 222, and 224 may operate in the wake-up mode during cycles of delivery traffic indicator map (DTIM) followed by buffering to data transmitted by the wireless communication devices 220, 222, and 224 operating in the low power modes transmitted by the repeater.

The wireless communication devices receive clock signals which are used for changing the modes and have a problem of worsening the tolerance. Therefore, the wireless communication device operates in the wake-up mode without corresponding to the time for timing of the clock signal. The wireless communication device operates in the wake-up mode for setting the time for timing of the clock signal with the TA in advance of the time for timing of the clock signal. However, in a case of setting the TA based on an inaccurate clock signal, the operation will be performed too early in the wake-up mode. Therefore, there is a concern about increased power consumption. Thus, the wireless communication devices 220, 222, and 224 of an embodiment of the present disclosure may set the optimal TA to minimize the power consumption by synchronizing the clock signal used for changing the modes and the clock signal used for performing wireless communication with the repeater 210.

Figure 3:
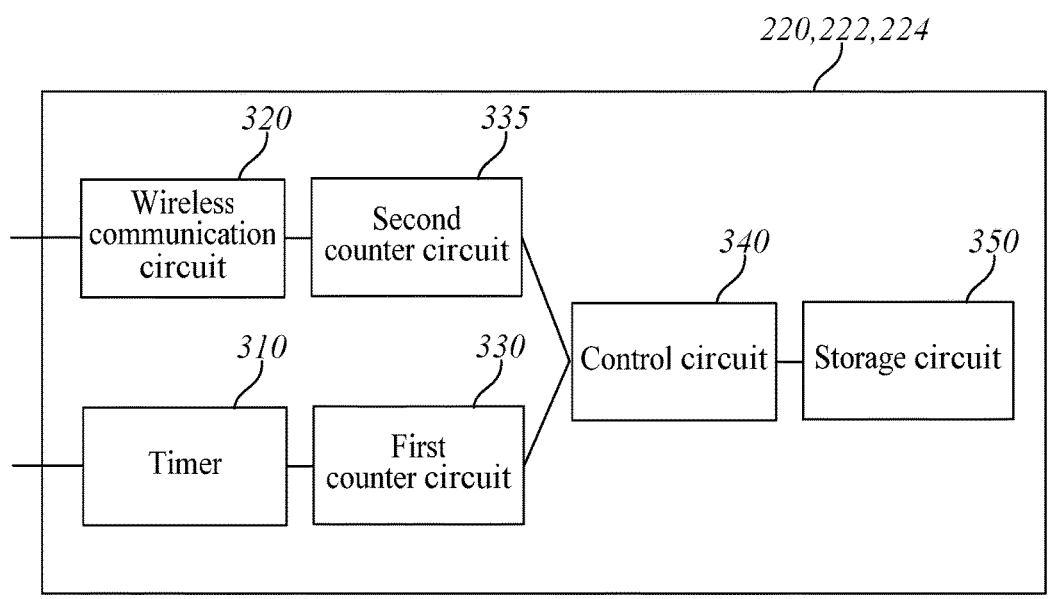
FIG. 3 is a diagram showing constituent elements of a wireless communication device according to an embodiment of the present disclosure.

FIG. 3 is a diagram showing constituent elements of a wireless communication device according to an embodiment of the present disclosure.

Referring to FIG. 3, the wireless communication devices 220, 222, and 224 according to an embodiment of the present disclosure include a timer 310, a wireless communication circuit 320, a first counter circuit 330, a second counter circuit 335, a control circuit 340, and a storage circuit 350.

The timer 310 receives a first clock signal from the outside of the wireless communication devices 220, 222, and 224 and transmits the first clock signal. The timer 310 receives the first clock signal with a lower frequency and a lower tolerance. The first clock signal is a signal used for the control circuit 340 to change the operation modes of the wireless communication devices 220, 222, and 224. The first clock signal is not limited to be set as the standard. Taking into the cost, a cheap clock source is often used for the first clock signal, so the frequency and accuracy are lower. The timer 310 receives the first clock signal and transmits the first clock signal to the first counter circuit 330.

The wireless communication circuit 320 performs wireless communication with the relay 210 to receive a beacon or send and receive data. The wireless communication circuit 320 may include an RF signal transceiver circuit used for transmitting or receiving a radio frequency (RF) signal in order to perform wireless communication. The wireless communication circuit 320 may include an analog to digital converter (ADC) or a digital to analog converter (DAC) used for converting the received signals to an analog signal or a digital signal.

The wireless communication circuit 320 receives the second clock signal from the outside of the wireless communication devices 220, 222, and 224 and transmits the second clock signal. The second clock signal is a signal for time synchronization and enables to accurately transmit and receive signals between the repeater 210 and the wireless communication devices 220, 222, and 224. The second clock signal is defined by the standard of the wireless network, which is desired to be used. The second clock signal is relatively higher than the first clock signal in both of the frequency and the tolerance. For example, the first clock signal usually uses the frequency of tens of kHz and the tolerance of several hundred ppm, in contrary, the second clock signal defined by the Wi-Fi standard mainly utilizes the frequency of 40 MHz, the tolerance must be within 20 ppm. The wireless communication circuit 320 receives the second clock signal and transmits the second clock signal to the second counter circuit 335.

The first counter circuit 330 counts the timing number of the first clock signal which is received from the timer 310. The first counter circuit 330 may count at a rising edge or a falling edge in a single cycle of the first clock signal, in order to count the timing number of the first clock signal. The first counter circuit 330 starts/ends to count based on controlling the control circuit 340. The first counter circuit 330 counts the timing number of the first clock signal until the end of the counting.

The second counter circuit 335 counts the timing number of the second clock signal which is received from the wireless communication circuit 320. Similar to the first counter circuit 330, the second counter circuit 335 starts/ends to count based on the controlling of the control circuit 340. The second counter circuit 335 counts the timing number of the second clock signal until the end of the counting.

The first counter circuit 330 or the second counter 335 may count by using a decremented count method or an incremented count method. The decremented counting method starts counting from a set value and deducts one of the timing number when the timing number is counted once. The incremented count method starts counting from an initial value and adds the timing number when the timing number is counted once.

The control circuit 340 controls the operation modes of the communication devices 220, 222, and 224 by using both of the first clock signal and the second clock signal. The first clock signal is received by the timer 310 and is counted by the first counter circuit 330. The second clock signal is received by the wireless communication circuit 320 and is counted by the second counter circuit 335. In the case of controlling the operation in the sleep mode, the control circuit 340 cuts off power to all of the constituent elements except for the timer 310 and the storage circuit 350. Herein, the power source may be provided from a usual power source (not shown) or may be provided from batteries (not shown) which are involved in the wireless communication devices 220, 222, and 224. In the case of controlling the operation in the wake-up mode, the control circuit 340 supplies power to all of the constituent elements in the wireless communication devices 220, 222, and 224. Different from the conventional wireless communication devices, the control circuit 340 uses not only the first clock signal received by the timer 310 to calculate the TA, but also the second clock signal which is higher than the first clock signal in the tolerance to calculate the TA. The control circuit 340 controls the operation modes of the wireless communication devices 220, 222, and 224 by applying the TA.

Figure 4:
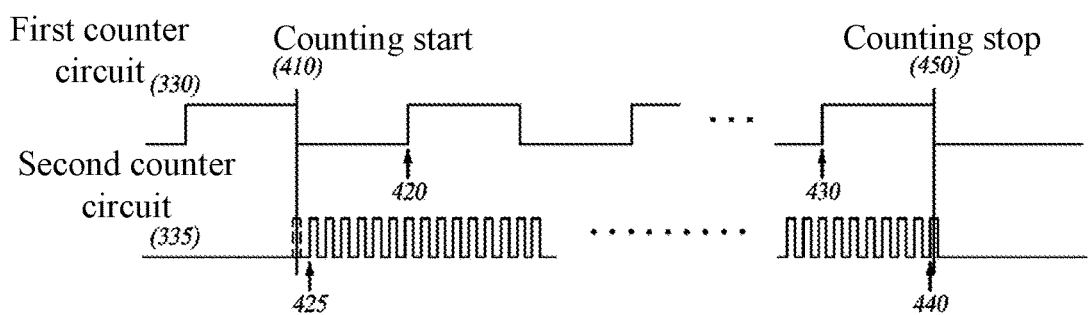
FIG. 4 is a diagram showing a method of counting for a TA set by a wireless communication device according to an embodiment of the present disclosure.

The control circuit 340 controls the start of the counting of the first counter circuit 330 and the second counter circuit 335. The control circuit 340 sets a benchmark of the timing number. The control circuit 340 controls the end of the counting of the first counter circuit 330 and the second counter circuit 335 based on the timing number counted by the first counter circuit 330. The control circuit 340 sets the TA by using both of the first clock signal and the second clock signal. The first clock signal is inputted into the timer 310. The second clock signal is inputted into the wireless communication circuit 320. If only the first clock signal is used, the tolerance is very poor. Therefore, the control circuit 340 sets an accurate TA by using the second clock signal which is relatively accurate. In order to set the TA, the control circuit 340 firstly has to know the timing number of the first clock signal and the timing number of the second clock signal. Because the timing number of counting of the second clock signal further has to be known, the control of the control circuit 340 is implemented while the wireless communication devices 220, 222, and 224 are operating in the wake-up mode. Now, the control circuit 340 sets a benchmark proportional to the time of the wireless communication devices 220, 222, and 224 operating in the wake-up mode with the control circuit 340. In a case that the wireless communication devices 220, 222, and 224 operate in the wake-up mode for a longer time, the benchmark is set correspondingly to a large value. On the other hand, in a case that the wireless communication devices 220, 222, and 224 operate in the wake-up mode for a shorter time, the benchmark is set correspondingly to a small value. In a case of that, the wireless communication devices 220, 222, and 224 operate in the wake-up mode, the control circuit 340 controls each of the counter circuit 330 and 335 to start the counting, and the control circuit 340 knows whether the timing number reaches a set benchmark when the first counter circuit 330 starts the counting. In a case of that, the timing number counted by the first counter circuit 330 has reached the set benchmark, the control circuit 340 controls each of the counter circuit 330 and 335 to stop the counting, and the control circuit 340 knows the timing number until the counting stopped. Referring to FIG. 4, each of the counter circuits 330 and 335 controlled by the control circuit 340 will be described in detail.

FIG. 4 is a diagram showing a method of counting for a TA set by a wireless communication device according to an embodiment of the present disclosure.

In a case of that, the wireless communication devices 220, 222, and 224 operate in the wake-up mode, the control circuit 340 controls each of the counter circuit 330 and 335 with a counting start 410. As a result, each of the counter circuits 330 and 335 starts to count the timing number for each of the clock signals.

In a case of that, the first counter circuit 330 counts the timing number of the first clock signal from a counting start 420 until the set benchmark 430, the control circuit 340 controls each of the counter circuit 330 and 335 with a counting stop 450.

Now, during a period after the controlling with the counting start 425 and before the controlling with the counting stop 440, the control circuit 340 knows the timing number of the second clock signal counted by the second counter circuit (hereinafter, simply referred to as "measured number of counting").

In FIG. 4, the method of counting each of counter circuits is represented by an incremented count method, but it does not have to be limited as described here.

Referring to FIG. 3 again, the control circuit 340 calculates an error between the measured number of counting and the timing number of the second clock signal supposed to be counted in theory by the second counter circuit during the control circuit 340 controls to stop counting after the counting started (hereinafter, simply referred to as "theoretical number of counting"). The theoretical number of counting is described as follows.

Herein, R is a set benchmark, Fw is a frequency of the second clock signal, and Ft is a frequency of the first clock signal. If the set benchmark is divided by the frequency of the first clock signal, then the time when the first clock signal is timed until the set benchmark is obtained, and if this time is multiplied by the frequency of the second clock signal, then the timing number of the second clock signal during the corresponding time is calculated. The error (hereinafter, simply referred to as "error between numbers of counting") between the measured number of counting and the theoretical number of counting may have a positive value or a negative value based on the measured error of counting. The control circuit 340 calculates the error between numbers of counting in the previous process to store in the storage circuit 350.

Now, the control circuit 340 stores the error between numbers of counting in the storage circuit 350, and the following situations have to be taken into consideration. That is, if it is assumed that the current wireless communication devices 220, 222, and 224 operate in the wake-up mode at the Nth time, then the error between numbers of counting has stored in the storage circuit 350, wherein the error between numbers of counting is defined by the wireless communication devices 220, 222, and 224 operating in the wake-up mode at the N−1th time. Therefore, the control circuit 340 has to consider what kind of the error between numbers of counting will be stored.

When the control circuit 340 stores the error between numbers of counting, different errors between numbers of counting will be stored as the situation.

The control circuit 340 determines whether the set benchmark is greater than a critical value. As described above, the set benchmark is set in proportion to the time of the wireless communication devices 220, 222, and 224 operating in the wake-up mode. If the set benchmark is greater than the critical value, then the wireless communication devices 220, 222, and 224 operate in the wake-up mode for a sufficiently long time. Therefore, the error between numbers of counting defined during the Nth wake-up operation may be considered as a reliable value. Therefore, in a case that the set benchmark is greater than the critical value, the control circuit 340 stores the storage circuit 350 with the error (the error between numbers of counting defined by the control circuit 340) which is defined during the Nth wake-up period instead of the error (the error between numbers of counting has stored) which is defined during the N−1th wake-up period.

In a case that the set benchmark is less than the critical value, the control circuit 340 determines whether the error between numbers of counting defined during the Nth wake-up period is larger than the error between numbers of counting defined during the N−1th wake-up period. If the set benchmark is less than the critical value, it is difficult to consider the error between numbers of counting defined during the Nth wake-up period as a reliable value. Therefore, in this case, the control circuit 340 does not immediately store to the storage circuit 350 with the error between numbers of counting defined during the Nth wake-up period. But, the control circuit 340 compares the error between numbers of counting defined during the Nth wake-up period with the error between numbers of counting defined during the N−1th wake-up period.

If the error between numbers of counting defined during the Nth wake-up period is greater than the error between numbers of counting defined during the N−1th wake-up period, the control circuit 340 stores a value which is obtained by adding a set constant to the error between numbers of counting defined during the N−1th wake-up period to the storage circuit 350. Because the error between numbers of counting defined during the Nth wake-up period is difficult to directly be trusted, it is only reflected in a case that the error between numbers of counting defined during the Nth wake-up period is larger than the previous one. The control circuit 340 stores the storage circuit 350 with the value which is obtained by adding the set constant to the already stored error instead of the already stored error.

Conversely, if the error between the numbers of counting defined during the Nth wake-up period is less than the error between the numbers of counting defined during the N−1th wake-up period, the control circuit 340 stores the storage circuit 350 with the value which is obtained by subtracting the set constant from the error between the numbers of counting defined during the N−1th wake-up period instead.

In a case that the error between the numbers of counting is defined and is stored in the storage circuit 350 as the situation, the control circuit 340 calculates the TA by using the the error between the numbers of counting stored in the storage circuit 350, the set benchmark, and a length during operation in the sleep period. As described below, the TA is calculated by the control circuit 340.

Herein, the error refers to the error between numbers of counting which is stored in the storage circuit 350, R refers to the set benchmark, and S refers to the length during operation in the sleep period. Dividing the error between numbers of counting by the set benchmark, thus the control circuit 340 obtains the error between numbers of counting which is generated during the Nth wake-up period. Thereafter, the control circuit 340 obtains the TA by multiplying an error rate by the length during operation of the sleep period (the length during the Nth sleep period). However, even if the error is defined by using the accurate second clock signal, the second clock signal itself has a small (about 20 p.p.m.) error. There is a possibility that a minor difference will be produced between the moment of operating in the wake-up mode based on the calculated TA and the moment of receiving the beacon, thereby missing to receive the beacon. In order to prevent such a problem, the control circuit 340 calculates the TA by adding a set offset to the value calculated in the above procedure. The control circuit 340 calculates the TA obtained by adding the offset, thereby eliminating the possibility of missing the beacon due to a minor error. Now, the TA may have a positive value or a negative value based on the error between numbers of counting which is stored in the storage circuit 350. In a case that the TA has a positive value, the control circuit 340 controls as that, reflecting the obtained TA, and operating in the wake-up mode by using the TA in advance to operate during the next wake-up period (the N+1th wake-up period). Conversely, in a case that the TA has a negative value, it is controlled to operate in the wake-up mode by delaying the TA during the next wake-up period.

In the above procedure, it is known that not only the first clock signal, but also the second clock signal is considered to accurately measure an actually generated error to calculate the TA. Therefore, the control circuit 340 may calculate an accurate TA. Thus, the wireless communication devices 220, 222, and 224 of an embodiment of the present disclosure may prevent a problem of operating in the wake-up mode after a beacon or a combination of the beacon and data transmitted by the repeater 210, and may also prevent to operate in wake-up mode too early due to a too big TA and a problem caused by increasing the power consumption.

The storage circuit 350 stores the error between numbers of counting based on the control of the control circuit 340. According to the control of the control circuit 340, the storage circuit 350 stores not only the currently defined error between numbers of counting (the error between numbers of counting defined during the Nth wake-up period) instead of the already stored error between numbers of counting (the error between numbers of counting defined during the N−1th wake-up period), but also updating (by adding the set constant to the stored error between numbers of counting or subtracting the set constant from the stored error between numbers of counting) the stored error between numbers of counting.

In addition, the storage circuit 350 stores some connection state keeping requirements such as connection information, authentication information, and the like, in order to maintain the connection state with the repeater 210. Thus, even if the wireless communication devices 220, 222, and 224 operate in the sleep mode and cut off power which is supplied to the wireless communication circuit 320, the connection state with the repeater 210 is also maintained.

Figure 5:
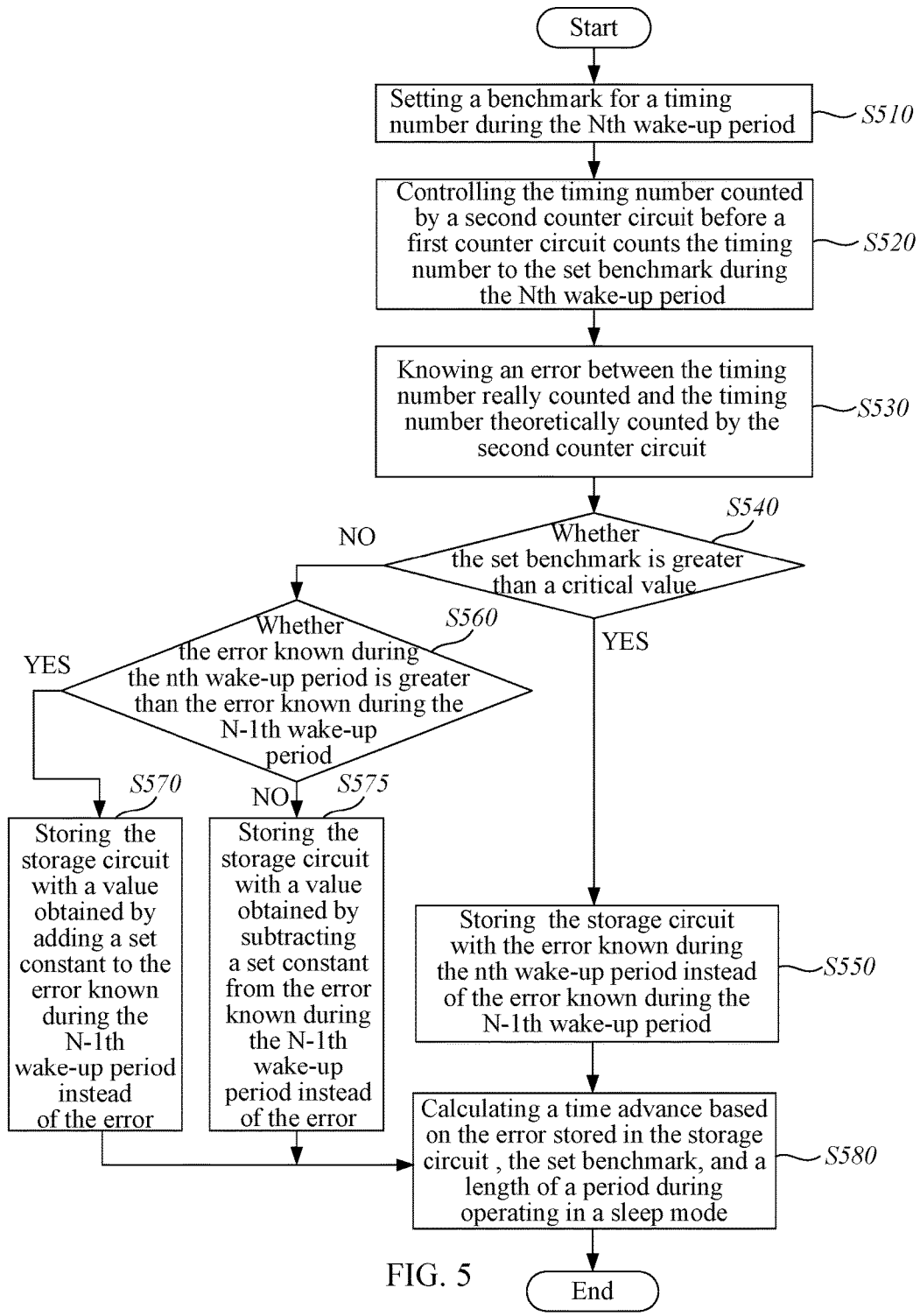
FIG. 5 is a flowchart showing a method of a TA set by the wireless communication device according to an embodiment of the present disclosure.

FIG. 5 is a flowchart showing a method of setting the TA in the wireless communication device according to an embodiment of the present disclosure.

The control circuit 340 sets a benchmark of the timing number during the Nth wake-up period (step S510). The control circuit 340 sets the benchmark according to a manner of proportional to the length during the Nth wake-up period (the time when the wireless communication device operates in the wake-up mode at the Nth time).

The control circuit 340 knows the timing number counted by the second counter circuit 335 before the first counter circuit 330 counts the timing number counted to the set benchmark during the Nth wake-up period (step S520). The control circuit 340 controls each of the counter circuits 330 and 335 to start the counting during the same period. In a case that the timing number of the first counter circuit 330 reaches the set benchmark, the control circuit 340 controls each of the counter circuits 330 and 335 to stop the counting. The control circuit 340 knows the timing number of the second clock signal counted from the start of counting until the stop of counting by the second counter circuit 335.

The control circuit 340 knows the error between the measured number of counting (the timing number of the second clock signal counted by the second counter circuit) and the theoretical number of counting (the timing number of the second clock signal supposed to be counted in theory by the second counter circuit) (step S530). In the above description, the error of the timing number known by the control circuit 340 has described. Therefore, specific description will be omitted.

The control circuit 340 determines whether the set benchmark is greater than the critical value (step S540).

In a case that the set benchmark is greater than the critical value, the control circuit 340 stores the error known during the Nth wake-up period instead of the error known during the N−1th wake-up period to the storage circuit 350 (step S550). In the case that the set benchmark is greater than the critical value, the error known during the Nth wake-up period is reliable, so the control circuit 340 stores the error known during the Nth wake-up period instead of the already stored error (the error known during the N−1th wake-up period) to the storage circuit 350.

In a case that the set benchmark is less than the critical value, the control circuit 340 determines whether the error known during the Nth wake-up period is greater than the error known during the N−1th wake-up period (step S560).

In the case that the error known during the Nth wake-up period is greater than the error known during the N−1th wake-up period, the control circuit 340 stores a value obtained by adding the set constant to the error known during the N−1th wake-up period instead of the error already stored in the storage circuit 350 to the storage circuit 350 (step S570). In a case that the set benchmark is less than the critical value, the error known during the Nth wake-up period does not to be trusted. Therefore, the control circuit 340 stores the value obtained by adding the set constant to the error already stored in the storage circuit 350 instead of the error already stored in the storage circuit 350 (errors known during the N−1th wake-up period).

In the case that the error known during the Nth wake-up period is less than the error known during the N−1th wake-up period, the control circuit 340 stores a value obtained by subtracting the set constant from the error known during the N−1th wake-up period instead of the error already stored in the storage circuit 350 to the storage circuit 350 (step S575).

The control circuit 340 calculates a TA by using the error stored in the storage circuit 350, the set benchmark, and a length during operation in the sleep mode (step S580). The control circuit 340 controls the operation mode by reflecting the TA calculated in this manner with a time point of operating in the wake-up mode during the next wake-up period (N+1th wake-up period).

As shown in FIG. 5, each procedure is described in sequence, but it is merely used to exemplarily explain the technical idea of an embodiment of the present disclosure. In other words, those of ordinary skill in the art to which the embodiments of the present disclosure belong may apply for changing sequence of procedures as described in drawings to execute or execute in parallel in a manner of one or more above procedure to implement various amendments and variation. Therefore, FIG. 5 is not limited to the sequential order.

On the other hand, the procedure shown in FIG. 5 may be configured as a computer-readable code in a recording medium, wherein the recording medium may be read by a computer. Computer-readable recording medium contains all types of recording devices, wherein the recording devices store data read by a computer system. That is, computer-readable recording media include, for example, magnetic storage media (e.g., read-only memory, floppy disks, hard disks, etc.), optically-readable media (e.g., compact disk read-only memory, digital versatile disks, etc.), and carrier waves (For example, storage media that is transmitted over the Internet. In addition, computer-readable recording media may be distributed to network-connected computer systems to store and execute computer-readable code in a decentralized manner.

The above description is only used to exemplarily explain the technical idea of the present embodiment, and those skilled in the art to which the embodiment belongs may achieve various corrections and modifications without departing from the essential characteristics of the present embodiment. Therefore, the present embodiment is an embodiment for explaining the technical idea of the present embodiment. The present embodiment is not used to limit the technical idea of the embodiment. The scope of the technical idea of the present embodiment is not limited by these embodiments. The scope of protection of this embodiment should be construed in accordance with the appended claims, and all technical ideas within the equivalent scope thereof should be construed as being included in the scope of the right of this embodiment.

DESCRIPTION OF SYMBOLS 110 sleep mode
120 wake-up mode
130 moment when the repeater actually sends a beacon
140 wake-up mode
145 operated in wake-up mode
150 TA
200 wireless communication system
210 repeater
220, 222, 224 wireless communication devices
230 Internet
310 timer
320 wireless communications circuit
330 first counter circuit
335 second counter circuit
340 control circuit
350 storage circuit
410 counting start
420 counting start with a timing number of the first clock signal
425 counting start
430 counting to a set benchmark
440 counting stop
450 counting stop
S510, S520, S530, S540, S550, S560, S570, S575, S580 steps

What is claimed is:
1. A wireless communication device is configured to operate in a sleep mode or a wake-up mode, wherein the sleep mode is configured to apply power only to at least one established of a plurality of constituent elements and cuts off power to rest of the constituent elements, and the wake-up mode is configured to apply power to all of the constituent elements, the wireless communication device comprising:
 a timer configured to receive a first clock signal from outside of the wireless communication device, wherein the first clock signal has a first frequency;
 a first counter circuit configured to count a timing number of the first clock signal;
 a near-field wireless communication circuit configured to apply power for performing a near-field wireless communication with a repeater to receive a second clock signal from outside of the wireless communication device only in the wake-up mode, wherein the second clock signal has a second frequency;
 a second counter circuit configured to count a timing number of the second clock signal; and
 a control circuit configured to calculate a timing advance based on an error, a set benchmark, and a length of a period of the wireless communication device operating in the sleep mode, by controlling the first counter circuit and the second counter circuit to stop counting, when the timing number of the first clock counted by the first counter circuit becomes the set benchmark, wherein the error is defined between the timing number really counted and the timing number theoretically counted from a start of counting until a stop of counting by the second counter circuit, in a case of the wireless communication device during operation in the wake-up mode at Nth time.

2. The wireless communication device as claimed in claim 1, wherein the second clock signal is higher than the first clock signal in both of frequency and tolerance.

3. The wireless communication device as claimed in claim 1, wherein the set benchmark is set differently according to a length of a period of the wireless communication device during operation in the wake-up mode.

4. The wireless communication device as claimed in claim 1, further comprising a storage circuit configured to store the error defined by the control circuit.

5. The wireless communication device as claimed in claim 4, wherein in a case of the set benchmark being greater than a critical value, the control circuit stores the storage circuit with the error defined by the wireless communication device during operation in the wake-up mode at the Nth time instead of the error stored in the storage circuit as defined by the wireless communication device during operation in the wake-up mode at the N−1th time.

6. The wireless communication device as claimed in claim 4, wherein in a case of the set benchmark being less than a critical value, the control circuit stores different errors in the storage circuit, according to a difference between the error stored in the storage circuit as defined by the wireless communication device during operation in the wake-up mode at the N−1th time and the error defined by the wireless communication device during operation in the wake-up mode at the Nth time.

7. The wireless communication device as claimed in claim 6, wherein in a case of the error defined by the wireless communication device during operation in the wake-up mode at the N−1th time being greater than the error defined by the wireless communication device during operation in the wake-up mode at the Nth time, the control circuit stores the storage circuit with a value obtained by subtracting a set constant from the error defined by the wireless communication device during operation in the wake-up mode at the N−1th time instead of the error defined by the wireless communication device during operation in the wake-up mode at the N−1th time.

8. The wireless communication device as claimed in claim 6, wherein in a case of the error defined by the wireless communication device during operation in the wake-up mode at the N−1th time being less than the error defined by the wireless communication device during operation in the wake-up mode at the Nth time, the control circuit stores the storage circuit with a value obtained by adding a set constant to the error defined by the wireless communication device during operation in the wake-up mode at the N−1th time in the storage circuit instead of the error defined by the wireless communication device during operation in the wake-up mode at the N−1th time.

9. The wireless communication device as claimed in claim 5, wherein the control circuit stores the timing advance by using the error stored in the storage circuit, the set benchmark, and the length of the period of the wireless communication device operating in the sleep mode.

10. The wireless communication device as claimed in claim 1, wherein the control circuit calculates the timing number theoretically counted until the stop of counting by the second counter circuit, according to the set benchmark, the first frequency, and the second frequency.

11. A timing advance calculation method, in which a timing advance is calculated by a wireless communication device configured to operate in a sleep mode and a wake-up mode, wherein the sleep mode is configured to apply power only to set at least one established of a plurality of constituent elements and cut off power to rest of the constituent elements, and the wake-up mode is configured to apply power to all of the constituent elements, the timing advance calculation method comprises:
- a receiving process for receiving a first clock signal from outside of the wireless communication device, wherein the first clock signal has a first frequency;
- a first counting process for counting a timing number of the first clock signal;
- a receiving process for receiving a second clock signal from outside of the wireless communication device only in the wake-up mode, wherein the second clock signal has a second frequency;
- a second process for counting a timing number of the second clock signal; and
- a control process for calculating the timing advance based on an error, a set benchmark, and a length of a period of the wireless communication device operating in the sleep mode, by controlling the first counter circuit and the second counter circuit to stop counting, when the timing number of the first clock counted by the first counter circuit becomes the set benchmark, wherein the error is defined between the timing number really counted and the timing number theoretically counted from a start of counting until a stop of counting by the second counter circuit, in a case of the wireless communication device during operation in the wake-up mode at Nth time.

12. The timing advance calculation method as claimed in claim 11, wherein the second clock signal is higher than the first clock signal in both of frequency and tolerance.

13. The timing advance calculation method as claimed in claim 11, wherein the set benchmark is set differently according to a length of a period of the wireless communication device during operation in the wake-up mode.

14. The timing advance calculation method as claimed in claim 11, further comprising a storing process for storing an error defined during the control process.

15. The timing advance calculation method as claimed in claim 14, wherein in a case of the set benchmark being greater than a critical value, the control process controls the storing process as below, that is, storing the error defined by the wireless communication device during operation in the wake-up mode at the Nth time instead of the error stored during the storing process as defined by the wireless communication device during operation in the wake-up mode at the N−1th time.

16. The timing advance calculation method as claimed in claim 14, wherein in a case of the set benchmark being less than a critical value, the control process controls the storing process as below, that is, storing different errors stored in the storage circuit, according to a difference between the error stored during the storing process as defined by the wireless communication device during operation in the wake-up mode at the N−1th time and the error defined by the wireless communication device during operation in the wake-up mode at the Nth time.

17. The timing advance calculation method as claimed in claim 16, wherein in a case of the error defined by the wireless communication device during operation in the wake-up mode at N−1th time being greater than the error defined by the wireless communication device during operation in the wake-up mode at Nth time, the control process controls the storing process as below, that is, storing a value obtained by subtracting a set constant from the error defined by the wireless communication device during operation in the wake-up mode at the N−1th time instead of the error defined by the wireless communication device during operation in the wake-up mode at the N−1th time.

18. The timing advance calculation method as claimed in claim 16, wherein in a case of the error defined by the wireless communication device during operation in the wake-up mode at the N−1th time being less than the error defined by the wireless communication device during operation in the wake-up mode at the Nth time, the control process controls the storing process as below, that is, storing a value obtained by adding a set constant to the error defined by the wireless communication device during operation in the wake-up mode at the N−1th time instead of the error defined by the wireless communication device during operation in the wake-up mode at the N−1th time.

19. The timing advance calculation method as claimed in claim 15, wherein during the control process, the timing advance is calculated by using the error stored during the storage process, the set benchmark, and the length of the period of the wireless communication device during operation in the sleep mode.

20. The timing advance calculation method as claimed in claim 11, wherein during the control process, the timing number theoretically counted until the stop of counting by the second counter circuit is calculated, according to the set benchmark, the first frequency, and the second frequency.

* * * * *